United States Patent Office 3,167,480
Patented Jan. 26, 1965

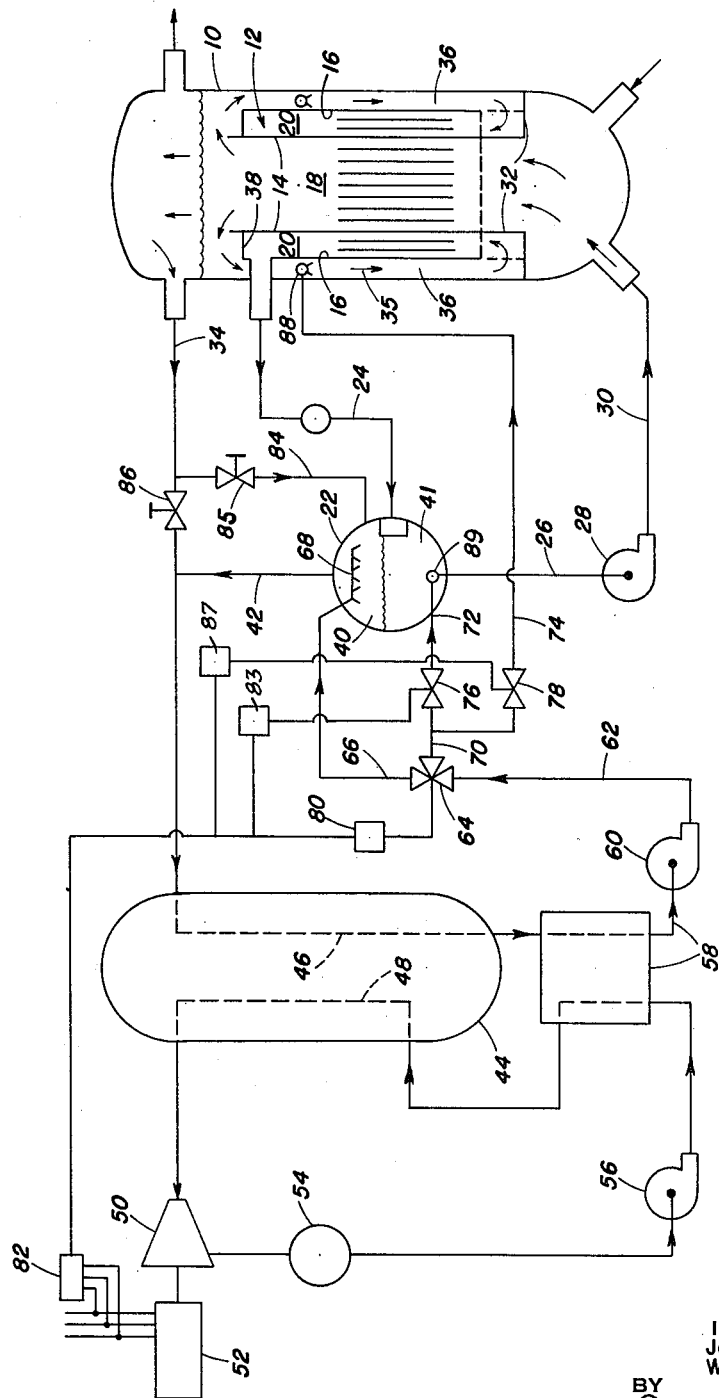

3,167,480
BOILING WATER REACTOR AND CONTROL
THEREOF
John M. West, Dunedin, Fla., and Walter H. Zinn, West
Hartford, Conn., assignors, by mesne assignments, to
Combustion Engineering, Inc., a corporation of
Delaware
Filed Aug. 26, 1960, Ser. No. 52,278
10 Claims. (Cl. 176—20)

This invention relates generally to boiling water reactors and has specific relation to an improved reactor system and control whereby the power output of the reactor is in part or wholly regulated by regulating the sub-cooling of the feedwater delivered to the reactor.

It has been recognized for some time that the power output of a boiling water nuclear reactor may be regulated by controlling the temperature or in other words the sub-cooling of the water introduced and passed through the reactor core, with the power output increasing with an increase in the sub-cooling and decreasing with a decrease in the sub-cooling. Several schemes have been proposed for controlling the power output of boiling water reactors by controlling the amount of sub-cooling of the feedwater delivered to the reactor, with U.S. Patent 2,861,033 to M. Treshow disclosing one such arrangement.

The art of reactor design has progressed to where concentrated effort is being directed to improving the well-known, basic reactor types in a way which will provide a more economic operation with the aim being to provide economic nuclear power as rapidly as possible.

The present invention is directed at this goal and is concerned with an improved control system for a boiling water reactor and an improved reactor system-control combination which reduces the capital cost as well as the operating cost of the reactor system and yet provides a highly satisfactory operation.

In accordance with the invention there is provided a boiling water nuclear reactor which is equipped with a steam and water drum or, in other words a steam separating drum which is separate from the reactor pressure vessel which houses the reactor core and within which vessel the steam is produced. This steam and water drum forms part of the circulating system for the reactor and receives a steam and water mixture from the reactor pressure vessel. In this drum the steam is separated from the water, with the drum having an upper steam space and a lower water space and steam is conveyed from the drum to a steam turbine, intermediate heat exchanger or the like while water from the lower portion of the drum is conveyed back to the lower region of the reactor pressure vessel and then passes up through the reactor core.

The power output of the reactor is controlled by regulating the introduction of feedwater into the reactor system at locations such that the amount of sub-cooling of this water as it passes through the reactor core is controllably varied.

Basically the sub-cooled feedwater is regulated between the steam space in the drum and the water space in the drum, i.e. the sub-cooled feedwater may be introduced by either having it sprayed into the steam space or introduced by a distribution conduit directly into the water in the lower portion of the drum and a suitable control valve is provided to proportion the introduction of the feedwater in these two locations. Spraying the feedwater into the steam space in the drum has the effect of heating the water to saturation temperature so that, in effect, the feedwater that is supplied to the reactor system in this manner has no sub-cooling. The feedwater that is introduced directly into the water in the lower region of the drum subcools this water so that it is below its boiling temperature when it enters the reactor core. Accordingly by controllably proportioning the introduction of the feedwater at these two locations the amount of sub-cooling of the water directed up through the reactor core may be regulated and accordingly the power output of the reactor may be regulated.

The employment of a separate drum, as mentioned hereinbefore, provides a region wherein adequate steam and water separation may be effected with this being a difficult and expensive task within the reactor pressure vessel itself. Furthermore the system may be arranged such that steam separation may be provided both in the reactor pressure vessel and in the steam and water drum with only a portion of the steam that is actually developed in the reactor core being conveyed to the steam and water drum and with such an arrangement providing two zones of separation and accordingly alleviating somewhat the rather difficult task of separating the water from the steam in a boiling water reactor system.

The invention is particularly well adapted for use with a two-pass reactor, with the two-pass reactor in combination with the control system mentioned hereinbefore providing a very efficient, economical and highly satisfactory operating arrangement. In the two-pass reactor the reactor core is divided by means of suitable baffling into a central region and an outer or peripheral region. The arrangement is such that the water entering the reactor vessel in the lower end is forced up through the central region of the core by means of a pump. Upon emerging from the upper end of the central region the steam thus developed is separated from the water with the steam passing out the upper end of the reactor pressure vessel. The water is directed down around the outside of the reactor core and then up through the peripheral core portion. The steam and water mixture emerging from the upper end of this peripheral core portion is directed to the steam and water drum. Since the central region of the core in such a reactor is the region of greatest sensitivity to changes in neutron moderation or absorption the effect of changing the sub-cooling of the water directed up through this central region provides a greater control of power output than could be achieved in a conventional one-pass boiling water reactor.

In accordance with the invention, the water conveyed from the steam and water drum is first conveyed up through the central portion of the core in this two-pass arrangement thereby providing a large or increased control of the power output of the reactor.

In the two-pass arrangement, in addition to providing a substantial range of control by proportioning the feedwater between the steam space and water space in the steam and water drum a control of the power output of the reactor can be effected by proportioning the sub-cooled feedwater between the water space in the steam and water drum and the downcomer that feeds the outer core portion of the reactor core. This in effect is proportioning the feedwater between the central and outer core portions. The effect on power output of a change in the sub-cooling in the central core portion is substantially greater than that in the outer core portion so a control of power output may be effected by thus proportioning the feedwater delivery.

It will be generally preferred to provide a fixed proportioning of the feedwater between the central and outer core portions although it may be advantageous to provide a primary control by proportioning the feedwater between the steam space and water space in the steam and water drum and a secondary or vernier control by proportioning the feedwater delivery between the water space in the drum and the outer region of the core.

One of the features of the invention concerns the introduction of feedwater by spraying it into the steam space in the steam and water drum. The steam and water drum is connected with the reactor pressure vessel by means of suitable piping and the arrangement is such that sudden and relatively large pressure variations in the steam and water drum caused by changing the amount of water sprayed thereinto have little or no effect on the pressure existing in the pressure vessel of the reactor. This is because of the relatively restricted communication between the steam and water drum and the reactor pressure vessel and this is an essential feature since the coupling between the pressure in the reactor vessel and the power level of the reactor is such that if the pressure were to vary substantially an unstable condition might be created in the reactor which would be unsafe.

Accordingly it is an object of this invention to provide an improved boiling water reactor system.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of the invention as shown by the accompanying drawing which is a diagrammatic representation of the system of the invention.

Referring now to the drawing, wherein like reference characters are used throughout to designate like elements, the preferred embodiment as illustratively disclosed therein includes cylindrical reactor pressure vessel 10 within which is mounted core 12 and which core may be made of a large number of vertically disposed, clad fuel rods that are assembled into a number of fuel assemblies with these assemblies, in turn, being assembled into the core. The fuel rods are spaced so as to provide vertical flow channels for cooling water therebetween and the core may have any desired transverse section configuration. Suitable baffles or the like, 14 and 16, divide the core into a vertically disposed central region 18 which is surrounded by an outer annular or peripheral region 20.

Laterally spaced from pressure vessel 10 is steam and water or separator drum 22 which receives steam and water from the vessel through conduit 24. Extending down from drum 22 is conduit 26 which is connected with circulating pump 28 and with this pump supplying water to the lower end of vessel 10 through conduit 30. The water entering vessel 10 through conduit 30 is directed up through the central region or passage 18 by means of baffle or duct 32 with this duct preventing this water from passing up around this central region 18 or up through outer region 20 but rather requiring all of the water from conduit 30 to pass through passage 18. Since this passage 18 occupies the central portion of the core, which is the portion of greatest power generation, this forced circulation through this central portion insures adequate cooling and distribution of the water, with the steam being generated as the water traverses this portion of the core. Upon emerging from passage 18 the steam thus generated passes up through the upper end of the pressure vessel and out conduit 34.

The core 12 is disposed within pressure vessel 10 so that there is provided an annulus or peripheral passage 36 about the core and between the core and the vessel wall. This annulus acts as a downcomer for water in the vessel with the water flowing as indicated by arrows 35 down therethrough and up through the peripheral core region 20. The upper end of core region 20 is closed with respect to the vessel interior by means of pivoted closure members 38 and the water that passes up through the peripheral region 20 is conveyed through conduit 24 to the steam and water drum 22. The fluid passing through conduit 24 is a mixture of steam and water with the steam having been generating during traversal of peripheral core region 20 and upon entering drum 22 the steam and water are separated with this drum having the upper region 40 comprised of a steam space while the lower region 41 is occupied with water.

The steam space 40 is connected with conduit 34 by means of conduit 42 so that steam from drum 22 is supplied to steam passing through conduit 34. The conduit 34 is connected with the heat exchanger 44 which, as diagrammatically illustrated, includes a primary coil or portion 46 and a secondary coil or portion 48 with heat being transferred from the steam in coil 46 to the fluid in coil 48. The steam produced by coil 48 is supplied to turbine 50 which in turn drives the generator 52, with the steam egressing from the turbine passing through condenser 54 and then to the pump 56. This pump is effective to force the water through the feedwater heater 58 and then through the coil 48 or heat exchanger 44.

The steam generated in the boiling water reactor, upon emerging from heat exchanger 44 passes through the feedwater heater 58 where it is condensed and where it is effective to heat the water in the secondary loop. From feedwater heater 58 the water of the primary loop, which is now in a sub-cooled condition, is conveyed or pumped back into the reactor system by means of the feedwater pump 60. (It will be understood that in lieu of this indirect cycle employing heat exchanger 44, the steam developed in the reactor may be introduced directly into turbine 50 and heat exchanger 44 eliminated, with the drawing merely illustrating one embodiment of the invention in this regard.)

The two pass or dual circulation system of the illustrative boiling water reactor of the invention has the advantage of providing a forced circulation up through the central region 18 of the reactor core which, because of the fact that this region is the region of greatest heat release, is the region where forced circulation is in greatest need.

In the illustrative arrangement the peripheral core region 20 has a combination of natural circulation resulting from the difference in density in the fluid in region 20 and downcomer 36 and forced circulation resulting from the difference in pressure at drum 22 and the corresponding location in downcomer 35, with this difference in pressure resulting from the difference in water level in drum 22 and pressure vessel 10 together with the pressure drop which is encountered by the steam flowing through the conduit 34 to the connection of conduit 42 therewith. Accordingly the circulation through the outer core region 20 is adequate for this region of lower heat release than the central region 18. Furthermore with this two pass reactor design the amount of water that must be circulated by the circulating pump 28 is substantially less than the conventional one pass arrangement. A still further advantage of the two pass arrangement is that there is a separation of steam and water both in the reactor pressure vessel 10 and in the steam and water drum 22 thereby alleviating the very troublesome problem of getting adequate separation of the steam from the water.

As embodied, the reactor is controlled by means of controlling the sub-cooling of the water that passes up through the reactor core. The feedwater that is delivered to the reactor system by feedwater pump 60 is, as previously mentioned, sub-cooled, i.e. its temperature is substantially below saturation temperature. This water is delivered from this pump 60 through conduit 62 to the proportioning valve 64. From this valve the water may be conveyed through conduit 66 to the spray head 68 or alternatively may be conveyed through conduit 70 with the valve 64 being operative to controllably proportion the admission of feedwater passing to conduit 66 and 70. Conduit 70 is connected with conduit 72 which leads to distribution conduit 89 in the water space 41 in drum 22 and is also connected with conduit 74 which leads to distribution conduit or ring 88 in the downcomer region 36 in the reactor pressure vessel 10. Accordingly water from valve 64 passing through conduit 70 may be directed either into the water space in drum 22 or in the downcomer region 36 in the pressure vessel and valves 76 and 78 are provided in conduits 72 and 74 respectively to proportion the water delivered to these two locations.

It will generally be desirable to provide a fixed proportioning of the water passing through conduit 70 between these two locations so that valves 76 and 78 will, once adjusted, generally remain unchanged.

The power output of the reactor is controlled by manipulating valve 64 to controllably proportion the amount of water that is directed into the steam space via conduit 66 and is directed into the water space of drum 22 and the downcomer 36 of pressure vessel 10 via conduit 70. The proportioning valve 64 is automatically regulated by means of motor 80 which in turn is controlled by means of the control device 82 which is responsive to the load on the generator.

The operation of the organization is such that as the load on the generator 52 decreases, motor 80, through controller 82 causes valve 64 to move so that a greater porportion of the sub-cooled feedwater delivered by pump 60 is conveyed to the spray head 68 and the proportion conveyed to conduit 70 is decreased. The feedwater introduced into the steam and water drum 22 via spray head 68 is heated to saturation by the steam in the steam space 40. Accordingly, increasing the proportion of the feedwater introduced through spray head 68 effectively decreases the sub-cooling of the water passing up through the reactor core and accordingly decreases the power output of the reactor. The system is preferably designed so that when it is operated at full load, i.e. 100% of capacity, there will be little or no feedwater introduced into steam space 40 by spray head 68 and accordingly the maximum sub-cooling effect will be had. As the load decreases the proportion of feedwater introduced into steam space 40 by spray head 68 will be progressively increased thereby decreasing the sub-cooling effect and decreasing the power output of the reactor.

In order to insure that there will be adequate steam and steam flow in drum 22 even when large quantities of water are sprayed thereinto via spray head 68, the conduit 84 may be provided as shown with valve 85 and conduit 34 with valve 86 which may be manipulated when desired to cause some steam from conduit 34 to enter drum 22.

While, as previously mentioned, it will be generally desirable to maintain a fixed relation or proportioning of the feedwater flow between the water space in drum 22 and the downcomer 36, i.e. between conduits 72 and 74, it will, in certain instances, be advantageous to vary the proportioning of the feedwater between these two locations. The primary control of the reactor power output may be effected by means of proportioning valve 64 while the final or vernier control may be made by adjusting valves 76 and 78 with relation to each other to adjustably proportion the delivery of the sub-cooled feedwater between the water space 41 in drum 22 and the downcomer 36 in pressure vessel 10. This control action may automatically be effected through control mechanism 82 and the motor means 83 and 87. Feedwater that is introduced into space 41 acts to provide a sub-cooling of the water that is passed up through the central region 18 of the reactor core while feedwater that is introduced into the region of downcomer 36 acts to provide a sub-cooling of the water going up through peripheral core region 20. A variation in the power output in the reactor is had by varying the introduction or proportioning of sub-cooled feedwater between central region 18 and peripheral region 20 for the reason that the reactivity worth of voids in the second pass is less than the reactivity worth of voids in the first pass, or in other words, the effect of a change of moderator density at the center of the reactor is much greater than the effect of a change of the same magnitude but opposite direction in the outer part of the reactor. Hence putting more cold water in the first pass over-rides an opposing effect of putting less cold water in the second pass, and thus a change in total power output will occur with a variation in the amount of condensate returned to each pass.

Obviously the change in power that is effected by varying the proportioning of the feedwater in the central region 18 and second pass 20 is much less than the power change which is effected by varying the proportioning of the feedwater between steam space 40 and the water region 41. In this latter instance the effect that is produced is to vary the sub-cooling in both the central region 18 and the outer region 20 in the same sense while in the former instance the effect that is produced is to vary the relative sub-cooling in the central region 18 and the outer region 20 and in the opposite sense. Accordingly this arrangement is well adapted for providing the initial and primary control by varying the proportioning of the feedwater through adjustment of valve 64 so that more or less water is sprayed into the steam space 40 to obtain the desired control action, while secondary and vernier like control can be effected by adjusting valves 76 and 78 so as to adjustably proportion the relative sub-cooling in the first pass 18 and second pass 20.

It will be appreciated that applicant's particular control arrangement in combination with the two pass reactor disclosed provides an extremely economical and yet satisfactory reactor system and control with the control of the invention being capable of automatically adjusting reaction power output to load demand without the adjustment of control rods. In this arrangement the only additional equipment necessary to provide this improved control arrangement, which from a neutron standpoint is considerably more economical than effecting this control by control rods as well as being much cheaper to fabricate and maintain, is the provision of the spray heads 68, the distribution conduit 89 which connects with conduit 72, the distribution conduit 88 which connects with conduit 74 and the valves and piping to supply these elements with sub-cooled feedwater. It will, of course, be understood that the control of the invention controls and adjusts reactor power in accordance with load demand and that control rods are employed for the purpose of shutting down the reactor and for compensating for reactivity changes due to fission products, fuel depletion etc. Since such control rods are conventional they are not illustrated in the drawing. Moreover, the control of the invention may be utilized in combination with control rods adjusted to vary the power with the load, in which case the number of control rods necessary for this purpose would be substantially decreased.

A very large range of power level control is provided with the system of the invention for the reason that the feedwater that is introduced through distribution conduit 89 as well as through the spray heads 68 initially passes through the combined central region of the core which is the region wherein the reactivity worth of the voids will be greatest.

In applicant's system the location where the feedwater is sprayed into the steam space is related to the reactor pressure vessel in such a manner that sudden and relatively large changes in pressure in this steam space are not reflected or developed in the reactor pressure vessel to any significant or substantial extent. This is achieved by interconnecting this steam space with the reactor pressure vessel through a sufficient resistance so as to provide the necessary dampening action. In the illustrative arrangement the injection of feedwater into steam space 40 through the spray head 68 has little or no effect on the pressure in the reactor pressure vessel.

While the invention finds unique application with the two pass reactor arrangement hereinbefore described and disclosed in the drawing it is not limited to a two-pass reactor system and may be applied in a one pass system having a steam and water drum such as that disclosed and which is connected with the reactor pressure vessel to receive a steam and water mixture therefrom.

Accordingly it will be understood that there is provided in accordance with the present invention, an improved power system employing a nuclear reactor of the boiling water type and wherein a simple, economical and highly satisfactory automatic control is provided and which control operates by varying the sub-cooling of the feedwater in the reactor core.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A boiling water reactor system supplying steam to a variable load and including a reactor pressure vessel having a boiling water nuclear reactor therein, a circulation system for circulating the water through the reactor and including a steam and water drum receiving a steam and water mixture from the reactor vessel and wherein a separation of the steam and water takes place and which drum has an upper steam space and a lower water space with the steam space communicating with said load, said drum being relatively restrictedly connected with said vessel to provide a substantial damping effect of pressure changes in the drum relative to the reactor vessel, means conveying subcooled feedwater to said system with this last named means including means to spray said water into a location in the steam space of the drum to thereby heat the water and means to introduce said feedwater at a location in the system where it enters the reactor subcooled, means operative to controllably proportion the introduction of feedwater between these two locations to regulate at least in part the reactor power output.

2. A power generating system comprising a boiling water nuclear reactor system having a reactor pressure vessel containing the reactor core, a steam and water drum separate from said vessel and connected with said vessel to receive a steam and water mixture therefrom, with the connection of the vessel with said drum providing a sufficient restriction so that sudden pressure variations in the drum are reflected only slightly in the reactor vessel, said drum having an upper steam space and a lower water space, means conveying steam from said drum to a variable load, means conveying water from the drum to the lower region of the reactor vessel for passage up through said core, a system for supplying subcooled feedwater to the reactor system including means to spray the feedwater into a location in the steam space in the drum and means to introduce the feedwater at a location such that it is directly into the water conveyed from the drum to the reactor vessel, means operative to controllably proportion to introduction of feedwater at these two locations and regulating means responsive to the variable load and operative to control said means to proportion the feedwater to cause an increased portion of the feedwater to be sprayed into the steam in response to the load decreasing and a less proportion in response to the load increasing.

3. A power system comprising a boiling water nuclear reactor including a reactor pressure vessel having a reactor core, a circulating system for circulating water through the core and including a pump, said core having a central region and an outer region in serial flow relation with respect to the cooling water with the circulating water first passing through the central region and with each region containing fuel, a steam and water drum forming part of the circulating system and connected with the reactor vessel to receive a steam and water mixture therefrom with the connection of the vessel with the drum being such that sudden pressure changes in the drum have little effect in the reactor pressure vessel, said drum having an upper steam space and a lower water space, means conveying steam from the reactor to a variable load, means to direct subcooled feedwater to a first location where it is sprayed into the steam space in said drum and to a second location where it is introduced directly into the water supplied from the drum to the reactor pressure vessel, means operative to controllably proportion the delivery of feedwater between these locations effectively in response to said load and in a manner to cause the power output to increase as the load increases and decrease as the load decreases.

4. In combination, a boiling water nuclear reactor having a core disposed in a reactor pressure vessel, said core having a central region and a separate outer region disposed thereabout, means for circulating water serially therethrough traversing the central region first, said means including a steam and water drum connected to receive steam and water from said vessel and a pump operative to convey water from the drum up through the central core region, means supplying steam from the reactor to a variable load, means for supplying sub-cooled feedwater to the reactor including means to introduce said water in said drum at a first location where it contacts the steam therein and is accordingly heated generally to saturation, means to introduce said water at a second location where it is introduced directly into the water supplied from the drum to the reactor core and means to introduce said water at a third location where its initial passage through the core is through the outer region thereof, means responsive to said load and operative to controllably proportion said feedwater delivery between said first location and, as a group, said second and third locations to control the power output in accordance with the load, and means responsive to said load and operative to controllably proportion said feedwater a delivery between the second and third locations to additionally control the power output in accordance with the load.

5. In an organization of the type described a boiling water nuclear reactor comprising a reactor core disposed within a container and having vertically disposed passages therein for the passage of water and steam therethrough, means dividing the core into a centrally disposed vertical region and a vertically disposed outer region about said central region, the upper end of the central region and the lower end of the outer region being open to the container interior, the upper end of the outer region being closed to the container interior, means conveying steam from the upper end of the vessel to a variable load, a steam and water drum separate from the vessel and having an upper steam space therein, means conveying a steam and water mixture from the outer core region to said steam and water drum, pump means operative to withdraw water from the drum and force it up through the central region of the core, means for spraying feedwater into the said steam space, means for introducing feedwater directly into the water supplied from the drum to the reactor core, a source of subcooled feedwater and means operative to proportion the delivery of this feedwater to said steam space and said water directly in response to said load, increasing the proportion sprayed into the steam space with a decrease in load and decreasing this proportion with an increase in load.

6. In a boiling water nuclear reactor system having a reactor core and supplying steam to a variable load the method of controlling the power output thereof in accordance with variations in the load comprising receiving a steam and water mixture from the reactor pressure vessel at a location separate from the pressure vessel, inhibiting pressure variations at this location from affecting the pressure in the reactor vessel, separating the steam from the water at said location, conveying the steam to said load, returning the water to the reactor and directing it up through the core thereof, supplying subcooled feedwater to the system and introducing the same into the steam at said location and directly into the water supplied to the reactor core from said location, controllably proportioning this feedwater between the location where it is introduced into the steam and the location where it is introduced directly into the water in accordance with the load, increasing the proportion introduced into the steam as the load decreases and decreasing it as the load increases thereby increasing and decreasing the power output of the reactor with increases and decreases, respectively, of the load.

7. The method of claim 6 including directing the water from said location initially through a confined central portion of the reactor core and thereafter through an outer region of the core with said central and outer region containing nuclear fuel.

8. The method of claim 7 including additionally supplying sub-cooled feedwater at a location where its initial passage through the core is through said outer region only, and in accordance with the load controllably proportioning the delivery of the feedwater between this last mentioned location and the location where it is introduced directly into the water supplied to reactor from said location where the steam is separated from the water, increasing the proportion introduced at the last mentioned location in response to an increase in load and decreasing it in response to a decrease in load.

9. In combination a boiling water nuclear reactor having a core disposed in a reactor pressure vessel, said core having a central region and an outer region in serial flow relation with respect to the cooling water flow, a circulating system for the reactor including a steam and water drum connected to receive steam and water from said vessel, means for conveying water from the drum up through the central core region, means supplying steam from the reactor to a variable load, means for introducing subcooled feedwater in said drum at a first location where it contacts the steam therein and is accordingly heated generally to saturation, means to introduce subcooled feedwater at a second location where it is introduced directly into the water supplied from the drum to the reactor core and means to introduce subcooled feedwater at a third location where its initial passage through the core is through the outer region thereof, and means for controlling the distribution of feedwater to these locations to control the power output of the reactor.

10. In a boiling nuclear reactor system having a core in a pressure vessel and supplying vapor to a variable load, a method of controlling the power output thereof in accordance with variations in the load comprising receiving a vapor and liquid mixture from the reactor pressure vessel at a location separate from the pressure vessel inhibiting pressure variations at said location from effecting the pressure in the reactor vessel, separating the vapor from the liquid at this location, conveying the vapor to said load, returning the liquid to the reactor and directing it up through the core thereof, supplying subcooled feed liquid to the system and introducing the same into the vapor at said location and directly into the liquid supplied to the reactor core from said location, and controllably proportioning said feed liquid between the location where it is introduced into vapor and the location where it is introduced directly in the liquid to control the subcooling of the liquid supplied to and passed up through the reactor and accordingly control the power output thereof.

References Cited in the file of this patent
UNITED STATES PATENTS

| 2,873,242 | Treshow | Feb. 10, 1959 |
| 2,949,414 | Ransohoff et al. | Aug. 16, 1960 |
| 3,042,600 | Brooks | July 3, 1962 |